(12) United States Patent
Kwon

(10) Patent No.: US 10,647,345 B2
(45) Date of Patent: May 12, 2020

(54) STEERING COLUMN FOR VEHICLE

(71) Applicant: MANDO CORPORATION, Gyeonggi-do (KR)

(72) Inventor: Hyun Bi Kwon, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 167 days.

(21) Appl. No.: 15/862,255

(22) Filed: Jan. 4, 2018

(65) Prior Publication Data

US 2018/0194387 A1 Jul. 12, 2018

(30) Foreign Application Priority Data

Jan. 10, 2017 (KR) .......................... 10-2017-0003475

(51) Int. Cl.
*B62D 1/20* (2006.01)
*B62D 5/04* (2006.01)
*F16C 27/04* (2006.01)
*F16H 1/16* (2006.01)

(52) U.S. Cl.
CPC ............. *B62D 1/20* (2013.01); *B62D 5/0409* (2013.01); *F16C 27/04* (2013.01); *F16H 1/16* (2013.01)

(58) Field of Classification Search
CPC .................................. B62D 1/20; B62D 1/16
USPC ........................................................ 180/444
See application file for complete search history.

(56) References Cited

U.S. PATENT DOCUMENTS

| | | | | |
|---|---|---|---|---|
| 5,749,786 | A * | 5/1998 | Pattok | B62D 1/16 403/354ke |
| 2001/0040067 | A1* | 11/2001 | Murakami | B62D 5/0409 180/444 |
| 2002/0029923 | A1* | 3/2002 | Tanioka | B62D 5/0403 180/444 |
| 2007/0193821 | A1* | 8/2007 | Imagaki | B62D 5/0409 180/444 |
| 2009/0050399 | A1* | 2/2009 | Segawa | B62D 1/20 180/444 |
| 2010/0108430 | A1* | 5/2010 | Uchihara | B62D 1/16 180/400 |

(Continued)

FOREIGN PATENT DOCUMENTS

| | | |
|---|---|---|
| CN | 103144666 | 6/2013 |
| CN | 104554426 | 4/2015 |

(Continued)

OTHER PUBLICATIONS

Office Action dated Dec. 10, 2019 for Chinese Patent Application No. 201810022110.6 and its English translation by Google Translate.

*Primary Examiner* — Tony H Winner
(74) *Attorney, Agent, or Firm* — Ladas & Parry, LLP

(57) ABSTRACT

Embodiments disclosed herein relate to a steering column of a vehicle. The steering column includes an input shaft having a first end connected to a steering shaft and an outer peripheral surface, to which a torque sensor is coupled; an output shaft connected to a remaining end of the input shaft and having an outer peripheral surface, to which a worm wheel is coupled; and a bearing module having an output shaft bearing configured to support the output shaft on an inner peripheral surface thereof, the bearing module sliding to be coupled to a gear housing in which the input shaft and the output shaft are housed.

8 Claims, 5 Drawing Sheets

(56) References Cited

U.S. PATENT DOCUMENTS

| | | | |
|---|---|---|---|
| 2012/0217085 A1* | 8/2012 | Sekikawa | B62D 5/0409 180/444 |
| 2013/0075189 A1* | 3/2013 | Sekikawa | B62D 5/0409 180/444 |
| 2016/0214642 A1 | 7/2016 | Pyo | |

FOREIGN PATENT DOCUMENTS

| | | |
|---|---|---|
| EP | 1 845 009 | 10/2007 |
| EP | 2 921 372 | 9/2015 |

* cited by examiner

STEERING COLUMN FOR VEHICLE

CROSS REFERENCE TO RELATED APPLICATION

This application claims priority from Korean Patent Application No. 10-2017-0003475, filed on Jan. 10, 2017, which is hereby incorporated by reference for all purposes as if fully set forth herein.

BACKGROUND OF THE INVENTION

1. Field of the Invention

Embodiments disclosed herein relate to a steering column for a vehicle (hereinafter, simply referred to as a "vehicular steering column"). The embodiments disclosed herein relate to a vehicular steering column, in which rotation resistance is reduced and the precision of a sensor is enhanced at a position where a worm shaft, a worm wheel, a torque sensor, or the like, to which a steering assist force is provided from a motor, is coupled, and a bearing is prevented from being deformed or broken by impact transmitted to an input shaft and an output shaft such that the input shaft and output shaft are not twisted or released from a predetermined position.

2. Description of the Prior Art

In general, a vehicular steering apparatus includes a power steering system, which is used as an auxiliary power mechanism in order to reduce the force that is required to be applied by a driver. The power steering system is classified into a hydraulic power steering system, which uses a hydraulic pressure for assisting a steering force by operating a hydraulic pump using the power of an engine, or an electric power steering system, which uses an electric motor.

The hydraulic power steering system has a structure in which the rotation of a steering wheel is sensed and a torque is received from an engine to operate a hydraulic pump, and the hydraulic pressure is sent to a driving unit, such as a cylinder, which is provided in a rack bar or a steering shaft, thereby assisting a driver's steering force.

The electric power steering system has a structure in which the rotation of a steering wheel is sensed to operate a motor that is installed in a rack or a steering shaft to assist a rotational movement, thereby causing the steering device to be smoothly operated. The electric power steering system is generally classified into a rack drive type (R-EPS) or a column drive type (C-EPS).

Since the steering column provided in such a conventional vehicular steering apparatus has a structure that merely supports the bearing on the outer circumferential surface of the output shaft because of the structure of the steering column, the assemblability is poor and it is difficult to align the input shaft and the output shaft coaxially.

In particular, there are problems in that the input shaft and the output shaft are twisted or disengaged at a predetermined position at which the worm shaft, the worm wheel, the torque sensor, etc., which are provided with a steering assist force from the motor, are coupled, whereby rotational resistance is increased, it is difficult to perform precise sensing using the sensor, and it is impossible to provide a correct steering assist force.

SUMMARY OF THE INVENTION

The embodiments disclosed herein have been made under the above-described background. An embodiments of the embodiment disclosed herein is to provide a vehicular steering column, in which rotation resistance is reduced and the precision of a sensor is enhanced at a position where a worm shaft, a worm wheel, a torque sensor, or the like, to which a steering assist force is provided from a motor, is coupled, and a bearing is prevented from being deformed or broken by impact transmitted to an input shaft and an output shaft such that the input shaft and the output shaft cannot be twisted or released from a predetermined position.

Further, the aspect of the present disclosure is not limited thereto, and other unmentioned aspects of the present disclosure may be clearly appreciated by those skilled in the art from the following descriptions.

In accordance with the aspects described above, embodiments disclosed herein provides a vehicular steering column including: an input shaft having a first end connected to a steering shaft and an outer peripheral surface, to which a torque sensor is coupled; an output shaft connected to a remaining end of the input shaft and having an outer peripheral surface, to which a worm wheel is coupled; and a bearing module having an output shaft bearing configured to support the output shaft on an inner peripheral surface thereof, the bearing module sliding to be coupled to a gear housing in which the input shaft and the output shaft are housed.

According to these embodiments disclosed above, rotation resistance can be reduced and the precision of a sensor can be enhanced at a position where a worm shaft, a worm wheel, a torque sensor, or the like, to which a steering assist force is provided from a motor, is coupled, and a bearing can be prevented from being deformed or broken by impact transmitted to an input shaft and an output shaft such that the input shaft and the output shaft cannot be twisted or released from a predetermined position.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
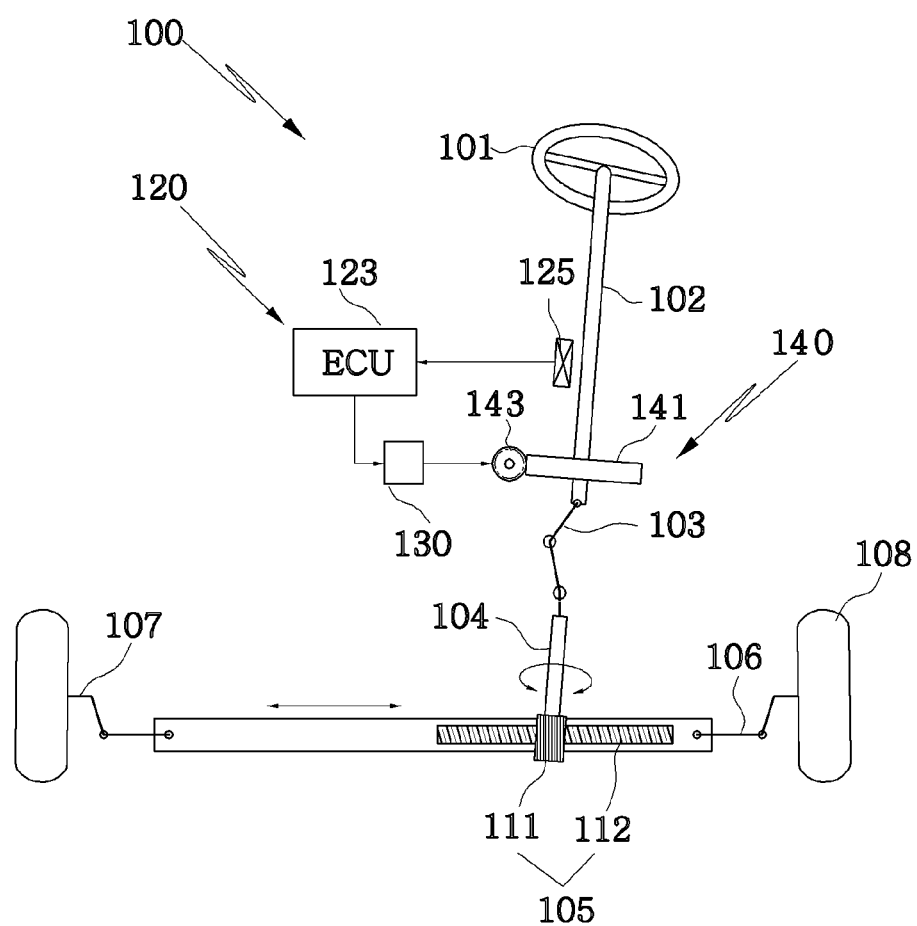
FIG. 1 is a schematic view illustrating a vehicular steering apparatus according to the present embodiments.

Hereinafter, embodiments will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a schematic view illustrating a vehicular steering apparatus according to the present embodiments. As illustrated in the drawing, the vehicular steering apparatus according to the embodiments includes a steering system that is continued from a steering wheel 101 to opposite wheels 108, and an auxiliary power mechanism 120 that provides a steering assist power.

The steering system 100 includes a steering shaft 102 that is connected, at one side, to the steering wheel 101 to be rotated together with the steering wheel 101, and, at the other side, to a pinion shaft 104 via a pair of universal joints 103.

In addition, the pinion shaft 104 is connected to a rack bar through a rack and pinion mechanism 105, and the opposite ends of the rack bar are connected to vehicle wheels 108 through tie rods 106 and knuckle arms 107. The rack-and-pinion mechanism section 105 is formed by meshing a pinion gear 111, which is formed on the pinion shaft 104, with a rack gear 112, which is formed on one side of the outer peripheral surface of the rack bar. Thus, when a driver operates the steering wheel 101, a torque is generated in the steering system 100 and the wheels 108 are steered by the torque via the rack-and-pinion mechanism section 105 and the tie rods 106.

An auxiliary power mechanism 120 includes: a torque sensor 125 configured to sense a torque that is applied to the steering wheel 101 by the driver and to output an electric signal that is proportional to the sensed torque; an Electronic Control Unit (ECU) 123 configured to generate a control signal based on the electric signal transferred from the torque sensor 125; a motor 130 configured to generate auxiliary power based on the control signal transferred from the ECU 123; and a reducer 140 including a worm wheel 141 and a worm shaft 143 to transmit the auxiliary power generated by the motor 146 to the steering shaft 102.

Figure 2:
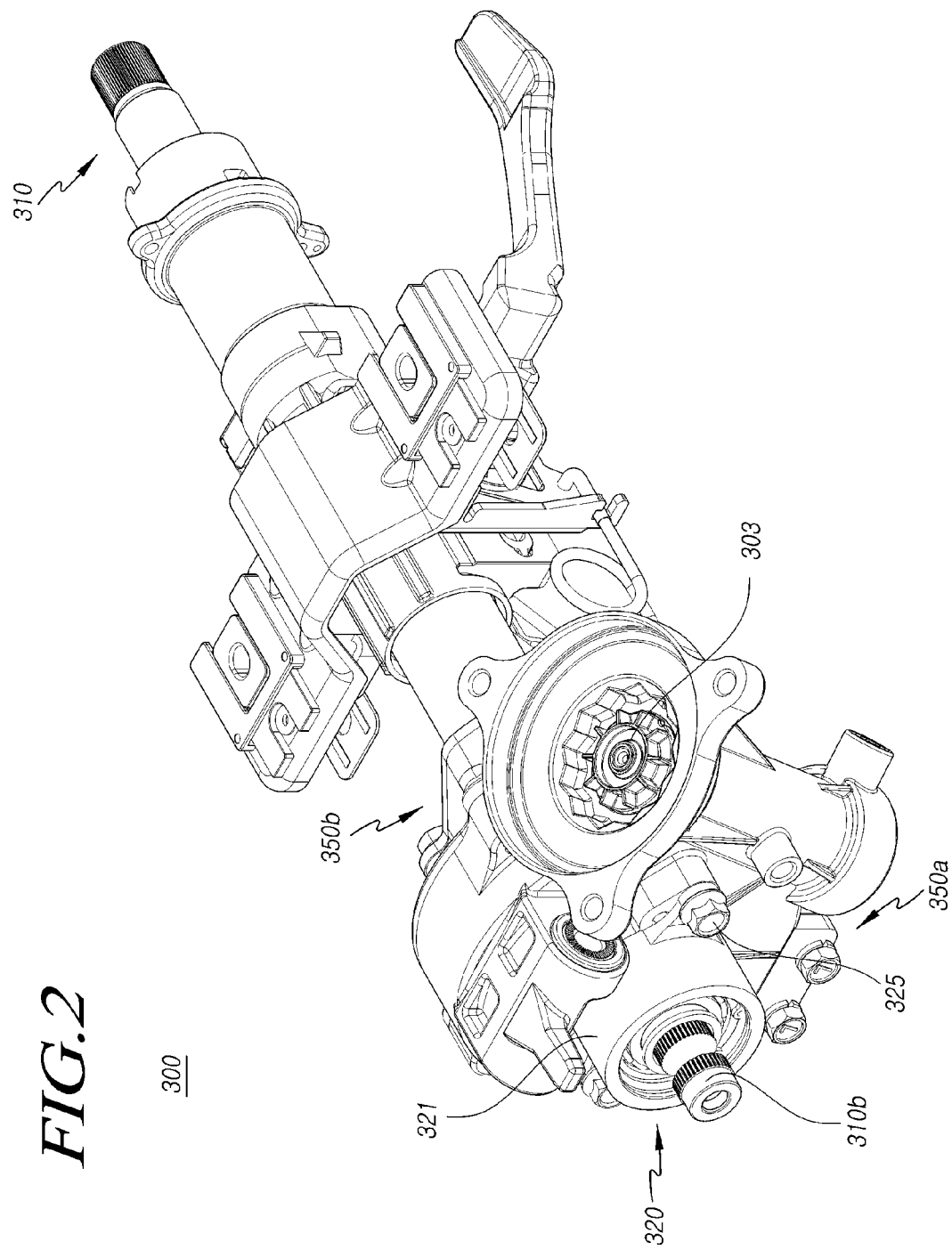
FIG. 2 is a perspective view illustrating a vehicular steering column according to the present embodiments.
Figure 3:
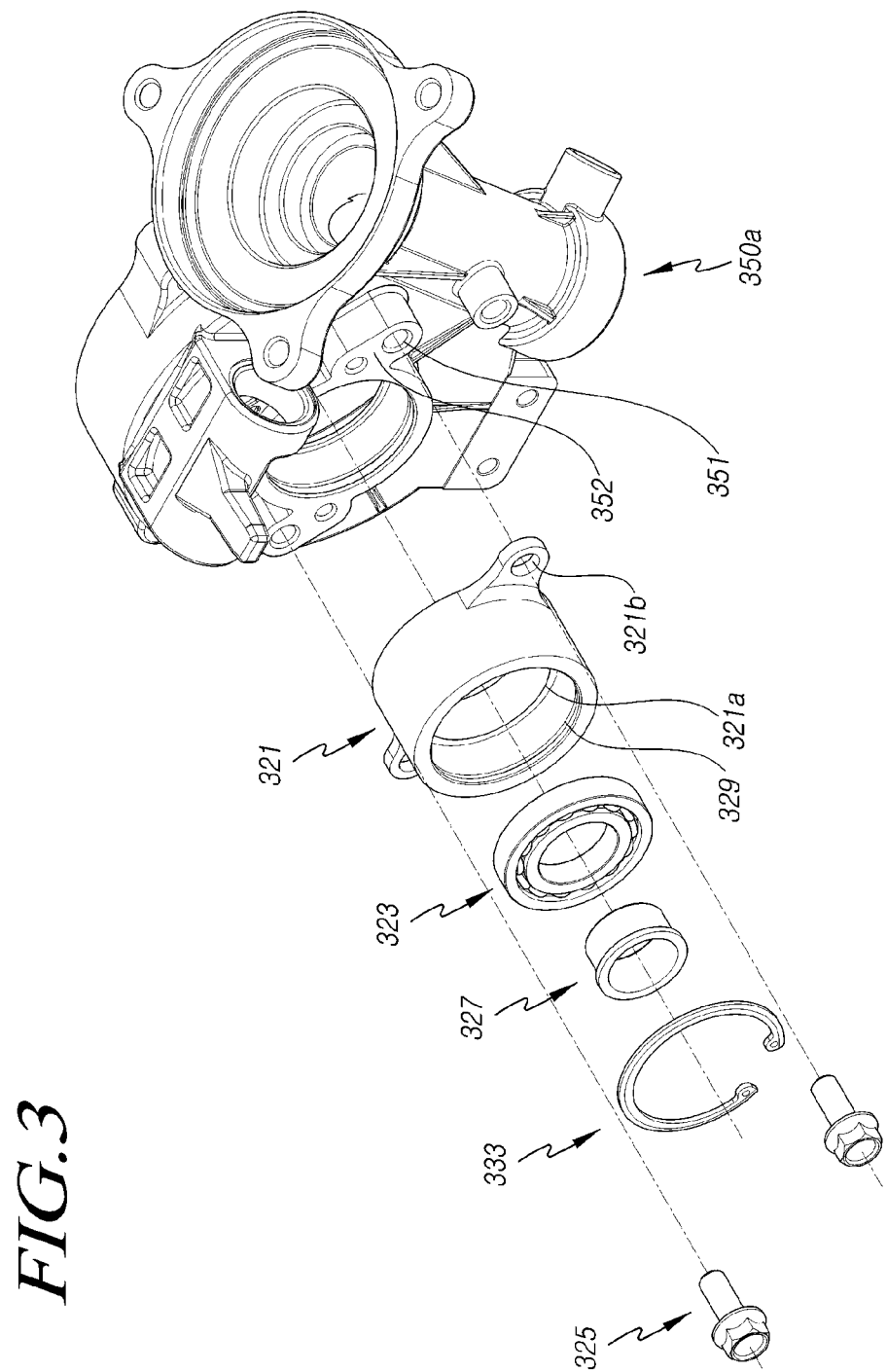
FIG. 3 is an exploded perspective view illustrating a part of the vehicular steering column according to the present embodiments.
Figure 4:
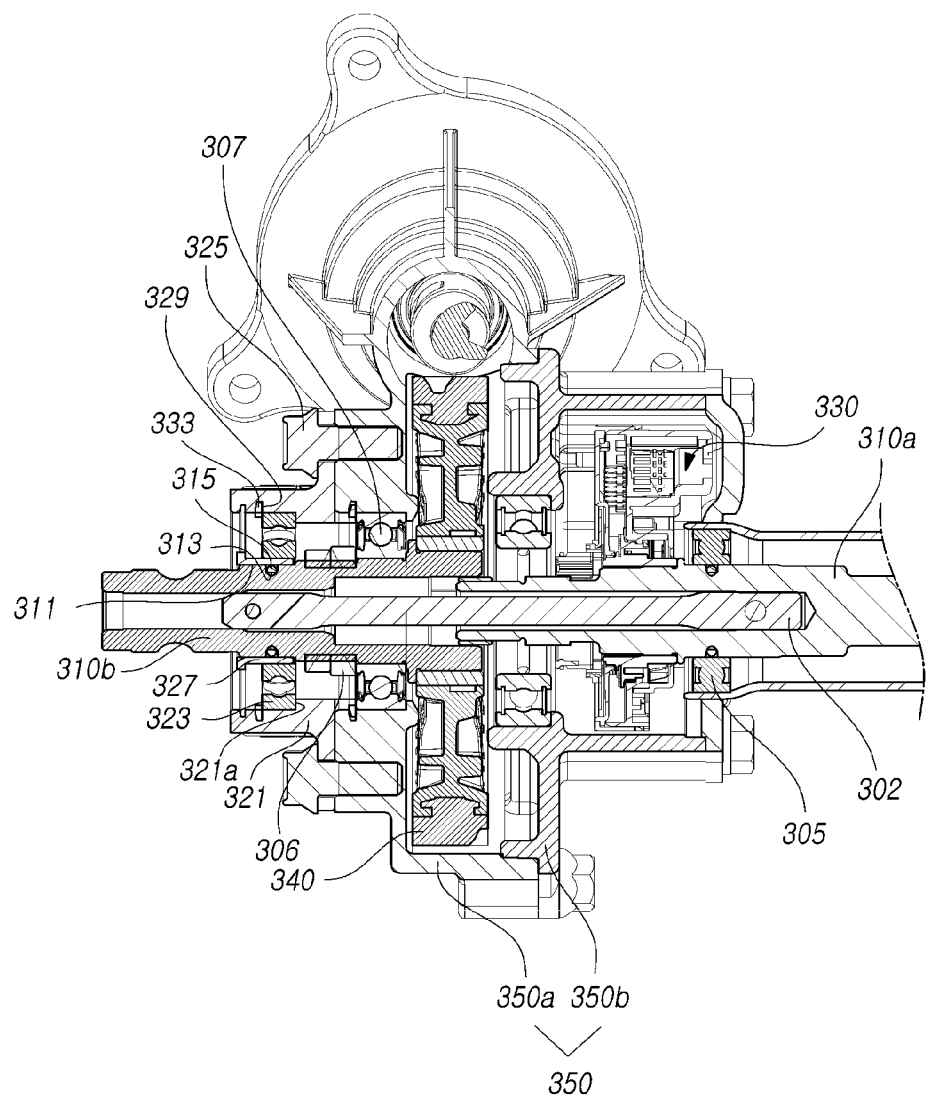
FIG. 4 is a sectional view illustrating a part of the vehicular steering column according to the present embodiments.
Figure 5:
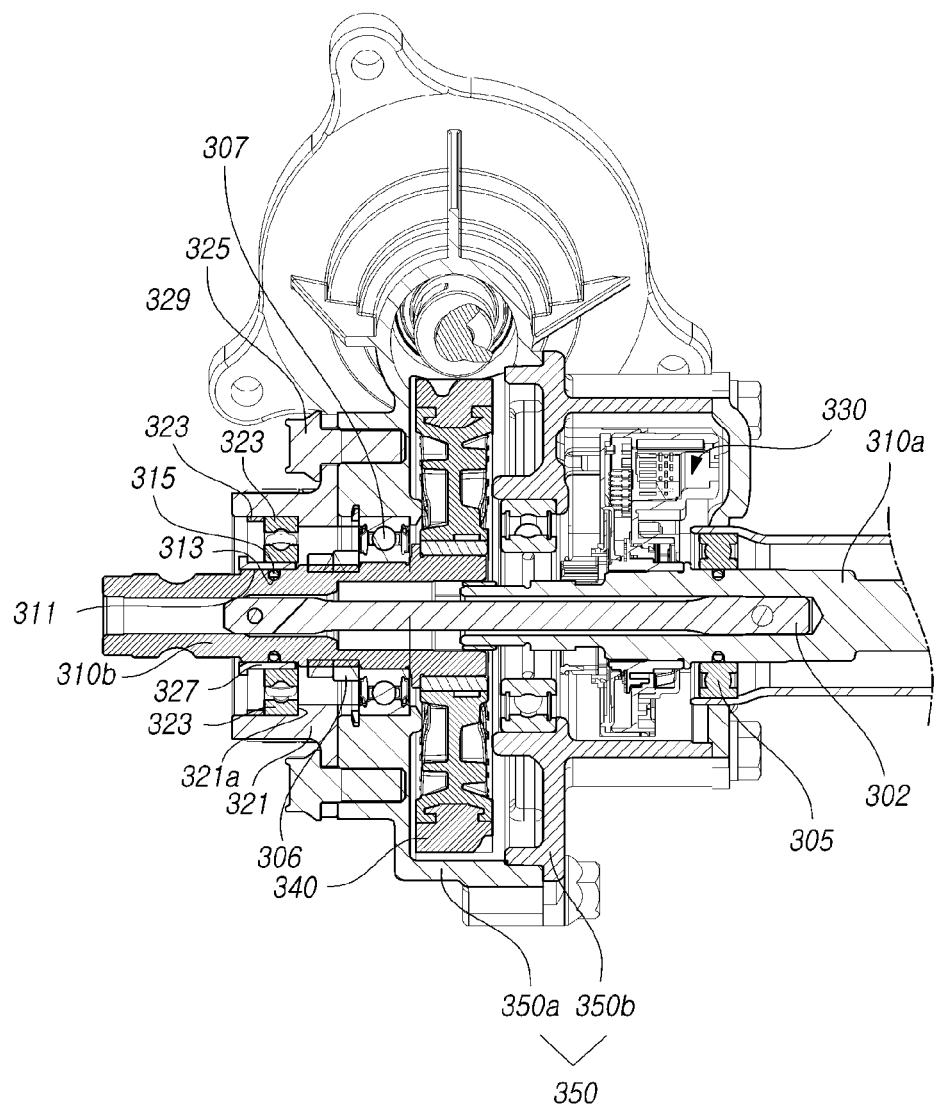
FIG. 5 is a cross-sectional view illustrating a part of the vehicular steering column according to the present embodiments.

FIG. 2 is a perspective view illustrating a vehicular steering column according to the present embodiments, FIG. 3 is an exploded perspective view illustrating a part of the vehicular steering column according to the present embodiments, FIG. 4 is a sectional view illustrating a part of the vehicular steering column according to the present embodiments, and FIG. 5 is a cross-sectional view illustrating the vehicular steering column according to the present embodiments.

As illustrated in these drawings, the vehicular steering column according to the present embodiments includes: an input shaft 310a connected to a steering wheel (see 101 in FIG. 1) at one end thereof and having an outer peripheral surface to which a torque sensor 330 is coupled; an output shaft 310b connected to a remaining end of the input shaft 310a and having an outer peripheral surface to which a worm wheel 340 is coupled; and a bearing module 320 including an output shaft bearing 323 on an inner peripheral surface of which the output shaft 310b is supported such that the bearing module 320 slides on the output shaft 310b to be coupled to a gear housing 350 in which the input shaft 310a and the output shaft 310b are housed.

The torque sensor 330 is coupled to the outer peripheral surface of the input shaft 310a connected to the steering wheel so as to measure a torque generated when the driver operates the steering wheel, and the input shaft 310a transmits a steering assist force to the output shaft 310b through the auxiliary power mechanism.

Here, the auxiliary power mechanism includes: the torque sensor 330 configured to sense a torque when the steering wheel is operated by the driver and to output an electric signal that is proportional to the sensed torque; an electronic control unit (not illustrated) configured to generate a control signal based on the electric signal transferred from the torque sensor 330; a motor configured to generate auxiliary power based on the control signal transferred from the electronic control unit; and a worm shaft 303 and a worm wheel 340 configured to transmit the auxiliary power generated by the motor to the output shaft 310b.

One end of the input shaft 310a is connected to the steering wheel, and the torque sensor 330 is coupled to the outer peripheral surface of the input shaft 310. One end of the output shaft 310b is connected to a remaining end of the input shaft 310a, and a remaining end of the output shaft is connected to a pinion shaft via a universal joint (see 101 in FIG. 1). One end of the torsion bar 302 is coupled to the inside of the input shaft 310a, and a remaining end of the torsion bar 302 is coupled to the inside of the output shaft 310b.

In addition, the worm wheel 340 is coupled to the outer peripheral surface of the one end of the output shaft 310b, which is connected to the remaining end of the input shaft 310a, so that a motor, which is driven by an electronic control unit based on a signal from the torque sensor 330 coupled to the input shaft 310a, drives the worm shaft 303, and the worm wheel 340, which is connected to the worm shaft 303, transmits a steering assist force, which is generated by the motor, to the output shaft 310b while being rotated in conjunction with the output shaft 310b.

Meanwhile, the output shaft 310b is configured such that an inner bearing 307 is fixed to the outer peripheral surface thereof at a position adjacent to the worm wheel 340 by the lock nut 306 so that the rotation of the worm wheel 340 is supported without vibration or oscillation, and the input shaft 310a is configured such that an input shaft bearing 305 is coupled to the outer peripheral surface thereof at a position adjacent to the torque sensor 330 so that the rotation of the torque sensor 330 is supported without vibration or oscillation.

In addition, the bearing module 320 having an output shaft bearing 323 for supporting the rotation of the output shaft 310b is coupled to the output shaft 310b at a position opposite the worm wheel 340 such that the output shaft 310b can be rotated without being shaken or deviated from a predetermined position during the rotation, thereby improving the assemblability and increasing the steering assist force transmission efficiency of the worm wheel 340.

The bearing module 320 is slidably assembled to the outer periphery side of the output shaft 310b to be coupled to a gear housing 350 in which the input shaft 310a, the output shaft 310b, etc. are housed. Here, the bearing module 320 may generally include a module housing 321, a bearing bush 327, a fixing member 333, etc.

The gear housing 350 has a structure in which a first gear housing 350a disposed on the input shaft 310a side and a second gear housing 350b disposed on the output shaft 310b side are coupled to each other.

The module housing 321 has a cylindrical shape in which the output shaft bearing 323 is coupled to the inner peripheral surface of the module housing 321. The module housing 321 has a step portion 321a on the inner peripheral surface of the central portion thereof in which the step portion 321a projects inwards so as to fix the position where the output shaft bearing 323 is coupled.

Accordingly, the inner position of the output shaft bearing 323 is fixed by the step portion 321a and the fixing member 333 is coupled to the inner peripheral surface of the end portion of the module housing 321 so as to prevent the output shaft bearing 323 from being separated, and thus the outer position of the output shaft bearing 323 is fixed.

In addition, a seating surface 352, which protrudes and forms a flat surface such that the module housing 321 slidably coupled to the output shaft 310b is seated thereon, is formed in the gear housings 350a and 350b, so that the module housing 321 can be seated on and fixed to the seating surface 352.

In addition, fastening flanges, which include fixing holes 321b respectively communicating with fastening holes 351 provided in the seating surface 352, are formed on the outer peripheral surface of the module housing 321 such that the module housing 321 can be supported on the seating surface while sliding on the outer peripheral surface of the output shaft 310b, thereby being coupled to the fastening holes 351 and the fixing holes 321b by fastening members 325.

Meanwhile, the bearing bush 327 is inserted into the inner ring of the output shaft bearing 323 and is coupled to the outer peripheral surface of the output shaft 310b during the sliding assembly of the bearing module 320. An elastic ring 315 is coupled to the outer peripheral surface of the output shaft 310b at the position where the bearing bush 327 is seated.

In addition, an insertion groove 313, to which the elastic ring 315 is coupled, is formed in the outer peripheral surface of the output shaft 310b such that the elastic ring 315 can be fixed in position while being prevented from being separated during the sliding assembly of the bearing module 320.

That is, a bush seating surface 311 having an increased diameter is formed on the outer peripheral surface of the output shaft 310b on which the bearing bush 327 is seated, and the insertion groove 313 is formed in the outer peripheral surface of the bush seating surface 311 in the circumferential direction such that the elastic ring 315 is elastically deformed into the insertion groove 313 to be assembled during the sliding assembly of the bearing module 320.

Accordingly, during the sliding assembly of the bearing module 320 on the output shaft 310b, it is possible to couple the bearing module 320 to the gear housings 350a and 350b by the fastening members 325 while positioning the output shaft 3109b and the input shaft 310a to be located coaxially with each other by the elastic force of the elastic ring 315 and the bearing bush 327.

In addition, as illustrated in FIGS. 3 and 4, the fixing member 333 is formed in a ring shape having a cut-out side and is coupled to the fixing groove 329 provided in the inner peripheral surface of the end portion of the module housing 321 while being elastically deformed. Alternatively, as illustrated in FIG. 5, the fixing member 333 may be a lock screw thread-coupled to the inner peripheral surface of the end of the module housing 321.

Therefore, the output shaft bearing 323 can be firmly supported in the axial direction and the radial direction by the fixing member 333, thereby coaxially supporting the output shaft 310b and the input shaft 310a without being shaken or released from a predetermined position.

However, the present disclosure is not necessarily limited to this, and the inner ring of the module housing 321 may be caulked to support and fix the outer ring of the output shaft bearing 323 in order to prevent the output shaft bearing 323 from being released.

According to these embodiments disclosed above, rotation resistance can be reduced and the precision of a sensor can be enhanced at a position where a worm shaft, a worm wheel, a torque sensor, or the like, to which a steering assist force is provided from a motor, is coupled, and a bearing can be prevented from being deformed or broken by impact transmitted to an input shaft and an output shaft such that the input shaft and the output shaft cannot be twisted or released from a predetermined position.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A steering column for a vehicle, comprising:
   an input shaft having a first end connected to a steering shaft and an outer peripheral surface to which a torque sensor is coupled;
   an output shaft connected to a remaining end of the input shaft and having an outer peripheral surface, to which a worm wheel is coupled; and
   a bearing module having an output shaft bearing configured to support the output shaft on an inner peripheral surface thereof, the bearing module sliding to be coupled to a gear housing in which the input shaft and the output shaft are housed.

2. The steering column of claim 1, wherein the bearing module comprises:

a module housing having the output shaft bearing on an inner peripheral surface thereof and coupled to the gear housing;

a bearing bush inserted into an inner ring of the output shaft bearing and sliding on and coupled to an outer peripheral surface of the output shaft to be supported on the outer peripheral surface of the output shaft; and a fixing member coupled to an inner peripheral surface of an end portion of the module housing to prevent the output shaft bearing from being released.

3. The steering column of claim 2, wherein the module housing has a step portion provided on the inner peripheral surface of a central portion thereof and protruding inwards to fix a position of the output shaft bearing.

4. The steering column of claim 2, wherein the gear housing has a seating surface which protrudes and forms a planar surface so as to allow the module housing to be seated thereon.

5. The steering column of claim 4, wherein the module housing has a fastening flange formed on an outer peripheral surface thereof and having a fixing hole communicating with a fastening hole provided in the seating surface, and the module housing slides on the outer peripheral surface of the output shaft, is supported on the seating surface and is coupled to the fastening hole and fixing hole with a fastening member.

6. The steering column of claim 2, further comprising:

an elastic ring coupled to the outer peripheral surface of the output shaft at a position where the bearing bush is seated, wherein an insertion groove is formed in the outer peripheral surface of the output shaft and the elastic ring is coupled to the insertion groove.

7. The steering column of claim 2, wherein the fixing member is formed in a ring shape having a cut-out side and is elastically deformed and coupled to a fixing groove provided in the inner peripheral surface of the module housing.

8. The steering column of claim 2, wherein the fixing member is a lock screw thread-coupled to the inner peripheral surface of the module housing.

* * * * *